(12) United States Patent
Farmer, II et al.

(10) Patent No.: US 11,948,383 B2
(45) Date of Patent: Apr. 2, 2024

(54) DOCUMENT CLASSIFICATION OF FILES ON THE CLIENT SIDE BEFORE UPLOAD

(71) Applicant: Capital One Services, LLC, McLean, VA (US)

(72) Inventors: William J. Farmer, II, Richmond, VA (US); Sreenidhi Narayanamangalathu Kesavan, Glen Allen, VA (US); Dimitri Bilenkin, Moseley, VA (US); William Clayton Jackson, Glen Allen, VA (US); Karthikeyan Palanivelu, Glen Allen, VA (US); Siddharth Mangalik, North Grafton, MA (US)

(73) Assignee: Capital One Services, LLC, McLean, VA (US)

( * ) Notice: Subject to any disclaimer, the term of this patent is extended or adjusted under 35 U.S.C. 154(b) by 222 days.

(21) Appl. No.: 17/223,922

(22) Filed: Apr. 6, 2021

(65) Prior Publication Data
US 2022/0318547 A1    Oct. 6, 2022

(51) Int. Cl.
*G06V 30/413*   (2022.01)
*G06N 20/00*   (2019.01)

(52) U.S. Cl.
CPC ........... *G06V 30/413* (2022.01); *G06N 20/00* (2019.01)

(58) Field of Classification Search
CPC .............................. G06V 30/413; G06N 20/00
See application file for complete search history.

(56) References Cited

U.S. PATENT DOCUMENTS

| | | | |
|---|---|---|---|
| 9,058,512 B1 | 6/2015 | Medina, III | |
| 9,672,510 B2 | 6/2017 | Roach et al. | |
| 10,225,521 B2 | 3/2019 | Gorodetski et al. | |
| 10,713,629 B1 | 7/2020 | Medina, III | |
| 11,295,175 B1* | 4/2022 | Adeniran | G06V 30/414 |
| 11,462,037 B2* | 10/2022 | Gehler | G06N 20/00 |
| 11,532,397 B2* | 12/2022 | Lucas | G06Q 40/08 |
| 2015/0104115 A1* | 4/2015 | Jin | H04N 21/4316 |
| | | | 382/296 |
| 2016/0034775 A1 | 2/2016 | Meadow et al. | |
| 2017/0157947 A1* | 6/2017 | Morikawa | B41J 2/2103 |
| 2018/0075138 A1* | 3/2018 | Perram | G06F 16/93 |
| 2019/0236349 A1* | 8/2019 | Eapen | G06V 30/413 |
| 2020/0143016 A1 | 5/2020 | Borkar et al. | |

(Continued)

FOREIGN PATENT DOCUMENTS

CN          109492170 A       3/2019

*Primary Examiner* — Helen Zong
(74) *Attorney, Agent, or Firm* — Sterne, Kessler, Goldstein & Fox P.L.L.C.

(57) ABSTRACT

A method for classifying a document in real-time is disclosed. The method includes identifying one or more sections of the document likely to contain text based on a contrast between dark space and light space in an image of the document. Optical character recognition is performed within the identified sections of the document to identify a set of words within each identified section of the document. The sets of words are extracted from the identified sections of the document, and a subset of the sets of words is selected for classifying the document based on a preconfigured option. The document is then classified by inputting the selected subset of words into one or more machine learning models. The method includes transmitting the document and the determined classification of the document to an external server.

19 Claims, 5 Drawing Sheets

(56) References Cited

U.S. PATENT DOCUMENTS

| | | | |
|---|---|---|---|
| 2020/0151333 A1* | 5/2020 | Tomiyasu | G06F 3/1244 |
| 2021/0151192 A1* | 5/2021 | Lucas | G16H 50/70 |
| 2021/0353260 A1* | 11/2021 | Srinivasa Naidu | A61B 8/5207 |
| 2022/0179906 A1* | 6/2022 | Desai | G06N 3/045 |
| 2022/0189187 A1* | 6/2022 | Narumi | G06V 30/32 |
| 2022/0237505 A1* | 7/2022 | Feldman | G06F 9/45558 |
| 2022/0255755 A1* | 8/2022 | Nakama | H04W 12/108 |
| 2022/0318647 A1* | 10/2022 | Ashrafzadeh | G06N 20/00 |

* cited by examiner

DOCUMENT CLASSIFICATION OF FILES ON THE CLIENT SIDE BEFORE UPLOAD

TECHNICAL FIELD

The present disclosure is related to image and/or electronic document analysis, such as optical text recognition and analysis within an image or electronic document located on a user equipment for classification prior to electronic transmission over a network.

BACKGROUND

Currently, computer-based or mobile-based technology allows a user to upload an image or other electronic version of a document for various purposes, for example, a foreign visa application. When the user uploads various documents using a computer or a mobile device via an application or a web browser, the user is also required to identify a type of the uploaded document. For example, the user may be asked to provide documents related to his/her income, tax returns for the last two years, a copy of the user's passport and/or driver's license, etc. When the user uploads the required documents, the user may identify the documents incorrectly or upload an incorrect document. Such incorrect identification by the user may inadvertently cause a delay in the user's request processing and inconvenience to the user.

BRIEF SUMMARY

In one embodiment, a method for classifying a document in real-time is disclosed. A first section of the document likely to contain text may be identified based on a contrast between dark space and light space in an image of the document. Optical character recognition may be performed within the identified first section of the document to identify a first set of words within the identified first section of the document. The first set of words may then be extracted from the identified first section of the document and a first subset of the first set of words may be selected for classifying the document based on a preconfigured option. The method may include classifying the document by inputting the selected first subset of the first set of words into one or more machine learning models. The one or more machine learning models may determine a classification of the document. The document and the determined classification of the document may then be transmitted to an external server.

In another embodiment, a user device for classifying a document in real-time is disclosed. The user device may include a memory for storing instructions and one or more processors that are communicatively coupled to the memory and configured to execute the instructions, which cause the one or more processors to perform a method such as that described above.

In yet another embodiment, a non-transitory, tangible computer-readable device having instructions stored thereon is disclosed. The instructions, when executed by at least one computing device, may cause the at least one computing device to perform operations such as those described with respect to the above method.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings are incorporated herein and form a part of the specification.

In the drawings, reference numbers generally indicate identical or similar elements. Additionally, generally, the left-most digit(s) of a reference number identifies the drawing in which the reference number first appears.

DETAILED DESCRIPTION

Provided herein are a method, a system, computer program product embodiments, and/or combinations and sub-combinations thereof for document classification of files on the client-side before uploading the files to an application server.

An objective of the present disclosure is to correctly classify a file by a user on the client-side before the file is transmitted to an application server. The user may be required to upload one or more documents in regards to various applications. For example, the user may be required to upload a copy of his/her driver's license, tax returns for the last two years, etc. The user may then upload these documents using user equipment (UE). Such UE may be a computer, a laptop, a desktop, a mobile phone, a tablet, etc. The user may upload the document using an application or a web browser running on the UE.

However, as stated above, the user may mistakenly upload an incorrect document, or incorrectly classify the document. As described herein, in accordance with some embodiments, the user only needs to upload the document, without classifying or stating what type of document the user has uploaded. The document may be classified automatically by the application or the web browser running on the UE, as described in detail below. After being automatically classified, the document may be transmitted to an application server along with the document classification information. By way of a non-limiting example, the document classification information may be sent as metadata of the document. In some embodiments, the document may be classified using the optical character recognition (OCR) technique described in detail below.

Various embodiments of these features will now be discussed with respect to the corresponding figures.

Figure 1:
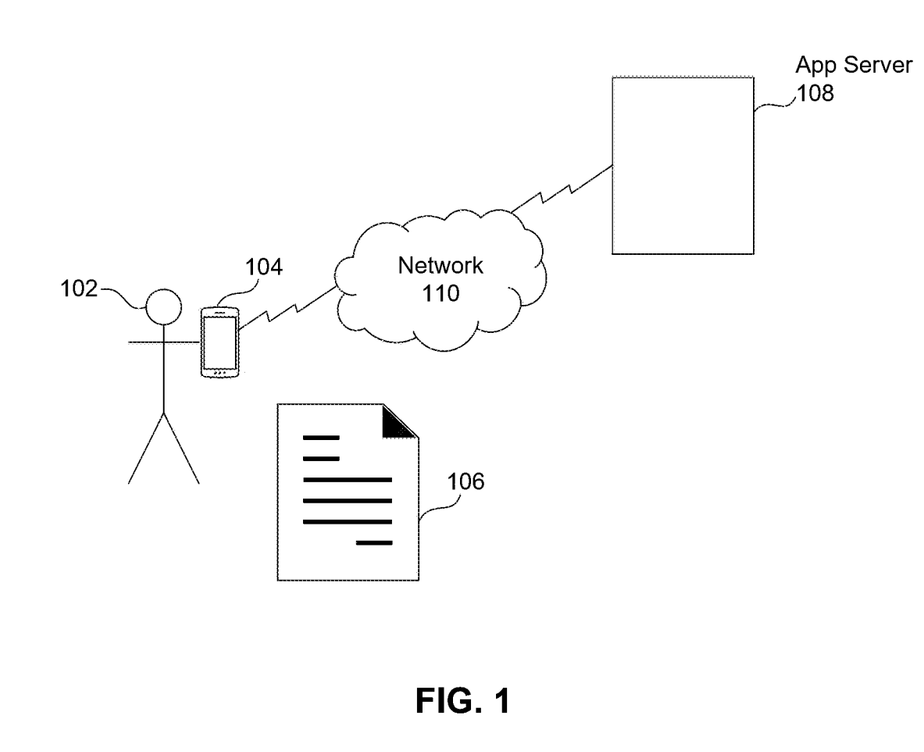
FIG. 1 illustrates an exemplary network in accordance with some embodiments.

FIG. 1 illustrates an exemplary network in accordance with some embodiments. As shown in FIG. 1, a user 102 may upload a document 106 using a user equipment (UE) 104. By way of a non-limiting example, the UE 104 may be a computer, a laptop, a desktop, a mobile phone, a tablet, etc. The user 102 may upload the document 106 using an application or a web browser running on the UE 104. The document 106 may be uploaded as a soft copy of the document. By way of a non-limiting example, the document 106 may be uploaded as a file of any common document format, such as ".doc," ".docx," ".xls," ".pdf," "*.jpeg," or "Alf," etc. The uploaded document 106 may be transmitted to an application server 108 via a network 110. The UE 104 may have an established connection with the application server 108 via the network 110 so that the user 102 may upload the document 106 to send to the application server 108. Accordingly, the UE 104 acts as a client, and the application server 108 acts as a server in a client-server model. The application or the web browser running the UE 104 may automatically classify the document 106 once uploaded by the user 102 for transmission to the application server 108. The network 110 may be a radio access network (RAN), a wireless network, a cellular network, a wireline network, a local area network (LAN), and/or a wide area network (WAN), etc.

Figure 2:
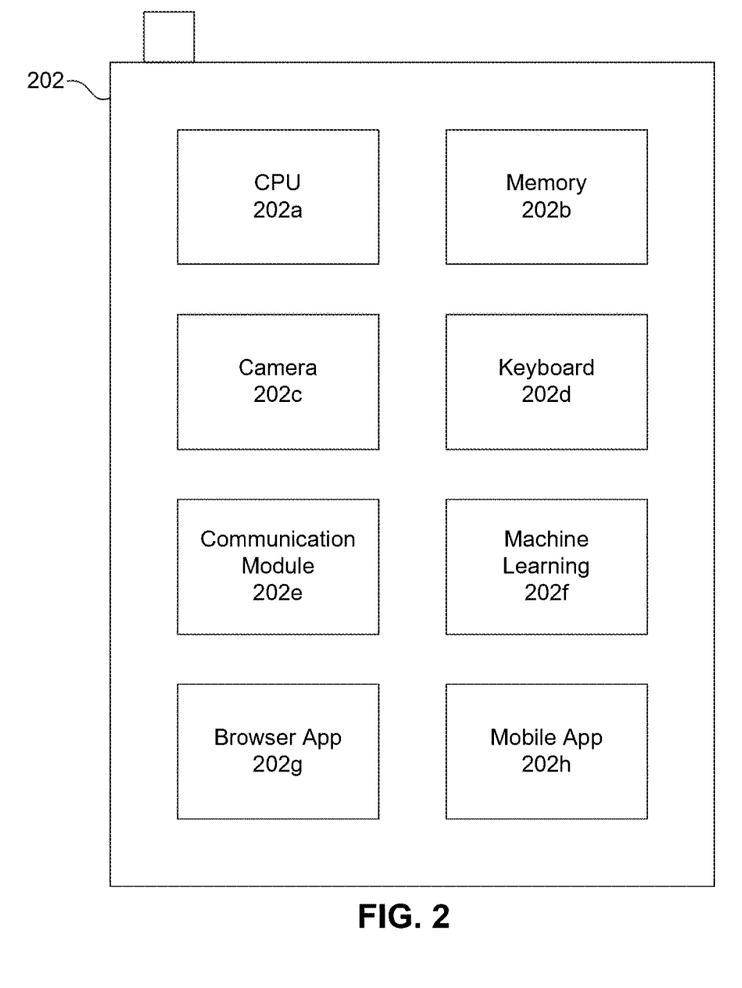
FIG. 2 illustrates exemplary user equipment in accordance with some embodiments.

FIG. 2 illustrates exemplary user equipment in accordance with some embodiments. As shown in FIG. 2, user equipment 202 may include a central processing unit (CPU) 202a, a memory 202b, a camera 202c, a keyboard 202d, a communication module 202e, a machine-learning algorithm 202f, a browser application 202g, and a mobile application 202h. The CPU 202a may be a processor, a microcontroller, a control device, an integrated circuit (IC), and/or a system-on-chip (SoC). The memory 202b may store instructions being performed by the CPU 202a. The camera 202c may allow the user 102 to upload the document 106 as an image file, such as a ".jpg" file. The user 102 may use the keyboard 202d to launch the mobile application 202h or the browser application 202g to upload the document 106 to transmit to the application server 108. Transmission of the document 106 from the UE 202 to the application server 108 via the network 110 may occur using a connection established between the UE 104 and the application server 108 via the communication module 202e. The machine-learning algorithm 202f may include an algorithm to classify the document 106, as described herein in accordance with some embodiments. The machine-learning algorithm may be a supervised machine-learning algorithm or an unsupervised machine-learning algorithm. By way of a non-limiting example, the machine-learning algorithm may be a Keras sequential classification model. The machine-learning algorithm 202f may be a light-weight algorithm. In other words, the size of the machine-learning algorithm 202f may be small for faster execution given the small memory size for the memory 202b. By way of a non-limiting example, the machine-learning algorithm 202f may be less than 1 megabyte (mb); in some embodiments, the machine-learning algorithm 202f may be less than 500 kilobytes (kb). Accordingly, the machine-learning algorithm may be installed on the UE 202 without a need of more memory. Further, the machine-learning algorithm may determine the document classify the document 106 in real-time, as the machine-learning algorithm may be executed faster because of its small size.

In this way, embodiments of the present disclosure differ from classification algorithms typically run on servers. Because servers typically have significant memory and processing power, the document may be processed through a full OCR process, and then that fully OCR'd document processed with standard classification algorithms based on the full text of the document. However, this process takes some time and is performed at the server, so some time may pass before the user is notified that the incorrect document was uploaded, or that the classification of the document was incorrect. Such memory- and processor-intensive processes also cannot feasibly be executed by a mobile device, because the mobile device does not have the same amount of resources as the server. By using embodiments described herein, however, a light-weight (under 500 kb) algorithm can analyze selective portions of a document to provide user-side, real-time document analysis so that the user can be notified very quickly of a documentation error.

Figure 3:
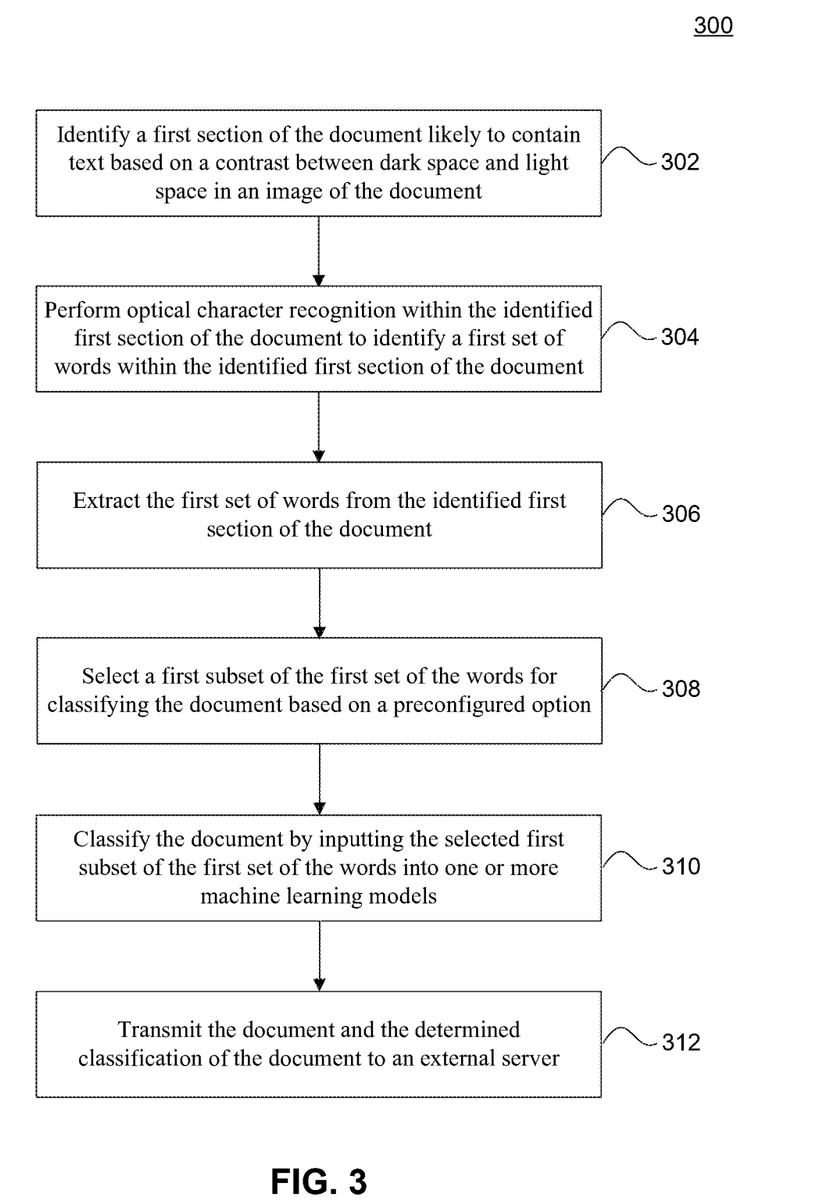
FIG. 3 illustrates a flow chart of steps for document classification, in accordance with some embodiments.

FIG. 3 illustrates a flow chart of steps for document classification, in accordance with some embodiments. At 302, once the document 106 is received by the UE 202, the UE 202 may identify one or more sections that may include text which can be used to classify the document or identify the type of document. The document 106 may be received by the UE 202 in any common document format, such as ".doc," ".docx," ".xls," ".pdf," ".jpeg," or "Alf," etc. For example, the user 102 may use the camera 202c to take an image of the document 106. The image of the document 106 may be received by the UE 202 as ".jpeg" file, for example. In some embodiments, the user 102 may use the keyboard 202d to retrieve the document 106, which may have been stored in a cloud. The document 106 stored in the cloud may then be received by the UE 202 using the communication module 202e. The communication module 202e may be a radio interface, for example. In some embodiments, the document 106 already exists in storage located on the UE 202, such as memory 202b.

Upon receiving the document 106 at the UE 202, the CPU 202a using the instructions stored in the memory 202b may process the received document 106 to identify one or more sections of the document 106 that may include text that may be used to identify the type of the documents. For example, the document 106 may be identified as a tax return, or a driver's license, etc. In some embodiments, the one or more sections of the document 106 that may include text may be determined based on a contrast between the dark space and the light space in the document. The perimeters of such identified sections of the document 106 may be referred to as bounding boxes in this disclosure. Accordingly, there may be more than one bounding box. By way of a non-limiting example, each bounding box may be on the same page of the document 106. For example, for a given document 106 having 3 pages, 4 bounding boxes may be identified based on the contrast between the dark space and the light space. Out of the 4 identified bounding boxes, 1 bounding box may be on page 1 of the document 106, and 3 other bounding boxes may be on page 2 or page 3 of the document 106. It may also be possible that out of the 4 identified bounding boxes, 1 bounding box may be on page 1, and 1 bounding box may be on page 2 with the remaining two bounding boxes on page 3. It may also be possible that all 4 bounding boxes may be on the same page.

In accordance with some embodiments, the bounding box may be determined by analyzing the contrast between the dark space and light space in an area of the document 106. The dark space may refer to letters or images and so may have some dye color, for example, black color, whereas the light space may refer to an absence of any letter or image. Accordingly, the light space may refer to a blank space. If the area of the document 106 when analyzed as a ratio of the dark space to the light space is above a predetermined threshold value, which is a configurable value, the area may be identified to include texts and/or images that may include information that may be used for identifying the type of the document. By way of a non-limiting example, the predetermined threshold value for the ratio of the dark space to the light space may be 60 percent. Accordingly, one or more bounding boxes may be identified in the document 106.

In some embodiments, additional image processing is needed to prepare the document for bounding box identification in 302. As some bounding boxes may be narrow and targeted, and may include only a few words, the document's contrast may need to be high enough for the UE to identify where one word ends and another begins, so as not to cut off any portions of words when identifying the bounding box perimeter. To do this, the image of the document may be manipulated to ensure a high contrast. Additionally, the image of the document may be manipulated to improve other qualities of the image, such as orientation, alignment, and visibility. It is to be noted that increased image manipulation increases the processing time. As such, in some embodiments, the amount of image manipulation performed may be limited by a timing threshold.

In order to reduce the processing time as compared to existing OCR tools, a limit on the number of words to be contained within a bounding box may be provided. For example, in some embodiments, each bounding box contains no more than 10-20 words. In some embodiments, each bounding box contains no more than 5-8 words. In some embodiments, each bounding box contains at least 4 words. In some embodiments, the number of words contained within each bounding box is proportional to the number of words included in the document as a whole. In accordance with some embodiments, the total number of bounding boxes may be dynamically determined based on the size of the uploaded document 106.

In accordance with some embodiments, at 304, optical character recognition (OCR) may be performed within the one or more bounding boxes identified at 302. Using the OCR technique, a set of words that appear in each bounding box of the one or more bounding boxes may be created at 306. The OCR algorithm applied to the text within the individual bounding boxes may be any known OCR algorithm known to a person skilled in the art. By way of a non-limiting example, the OCR algorithm may be based on an open-source OCR engine such as Tesseract. Accordingly, the OCR technique is not described in detail here. The set of words identified in each bounding box may be stored as a data structure, for example, a list, a set, and/or a vector, etc.

In accordance with some embodiments, at 308, a subset of words from the set of words identified in each bounding box at 306 may be selected. Instead of submitting each word in the bounding box to a classification algorithm, classifying based on the subset of words may help determine the type of the document 106 faster. The subset of words to be used for classifying the document may be selected based on a preconfigured option. By way of a non-limiting example, the subset of words may be selected based on a character length in each word. For example, words that are two or less than two characters may not be included in the subset of words. In another example, words that are more than eight characters may not be included in the subset of the words. In yet another example, the words for the subset of words may be selected randomly from the set of words. In some cases, words that include a special character may not be selected in the subset of words. The special character may be user-defined, and/or the list of special characters may be preconfigured. In order for the classifier, such as machine-learning algorithm 202f, to process the subset of words quickly, a threshold may be placed on the number of words included in each subset of words.

In accordance with some embodiments, at 310, the subset of words determined at 308 may be provided as an input to the machine-learning algorithm 202f. The machine-learning algorithm may have been trained on tagged files corresponding to each available document type. In some embodiments, the machine-learning algorithm may include a predefined library of words. For each specific type of document, the predefined library of words in the machine-learning algorithm may include a list of corresponding words that are related to the specific type of document. When the subset of words determined at 308 are analyzed against the predefined library of words for each type of the documents, the subset of words may be identified as matching a particular document type based on a number of words in the subset of words that match with the predefined library of words for the particular document type. By way of a non-limiting example, the total number of words in the subset of words may be required to match at least a predetermined percentage to be recognized as indicating a particular document type. In the event that the document 106 may be identified to match more than one document type, a probability score may be assigned based on the number of words in the subset of words that match with words corresponding to the document type based on the predefined library of words. Based on the probability score, the document 106 may be assigned a particular document type.

By way of a non-limiting example, a probability score under a preconfigured threshold value may be discarded for consideration. The document 106 may be determined to be a particular document type for which the probability score is the highest. In some embodiments, if the document is determined to be of more than one document type based on the probability score, the document may be assigned as matching more than one document type, and metadata may be set for further inspection by an agent for correct identification of the document.

In accordance with some embodiments, at 312, the document and its metadata identifying the document type determined at 310 may be transmitted from the UE 202 to the application server 108 via the network 110. By way of a non-limiting example, before transmitting the document and its metadata to the application server 108, the determined document type may be displayed to the user 102 for confirmation. And upon confirmation by the user 102, the document 106 and its metadata may be transmitted to the application server 108.

In some embodiments, every step in method 300 may be performed locally by a UE, such as UE 104. Because only a small percentage of words in the document need be processed by an OCR algorithm, and because the classification model uses fewer than all the words in the document, the combined size of the machine learning models, such as machine learning algorithm 200f, may be equal to or less than 1 megabyte (mb). In some embodiments, the combined size of the machine learning models may be equal to or less than 500 kb. The small size allows the process to execute locally to the UE, without requiring any steps to be performed by a remote server. Further, limiting the number of words being processed means that the UE-side analysis can be performed in real-time or near real-time. This allows the user to be notified of a documentation error quickly, before the user has continued on to a next step or closed out of the application. This improves the user experience significantly, and reducing errors in document classification speeds up the overall document verification process.

Figure 4:
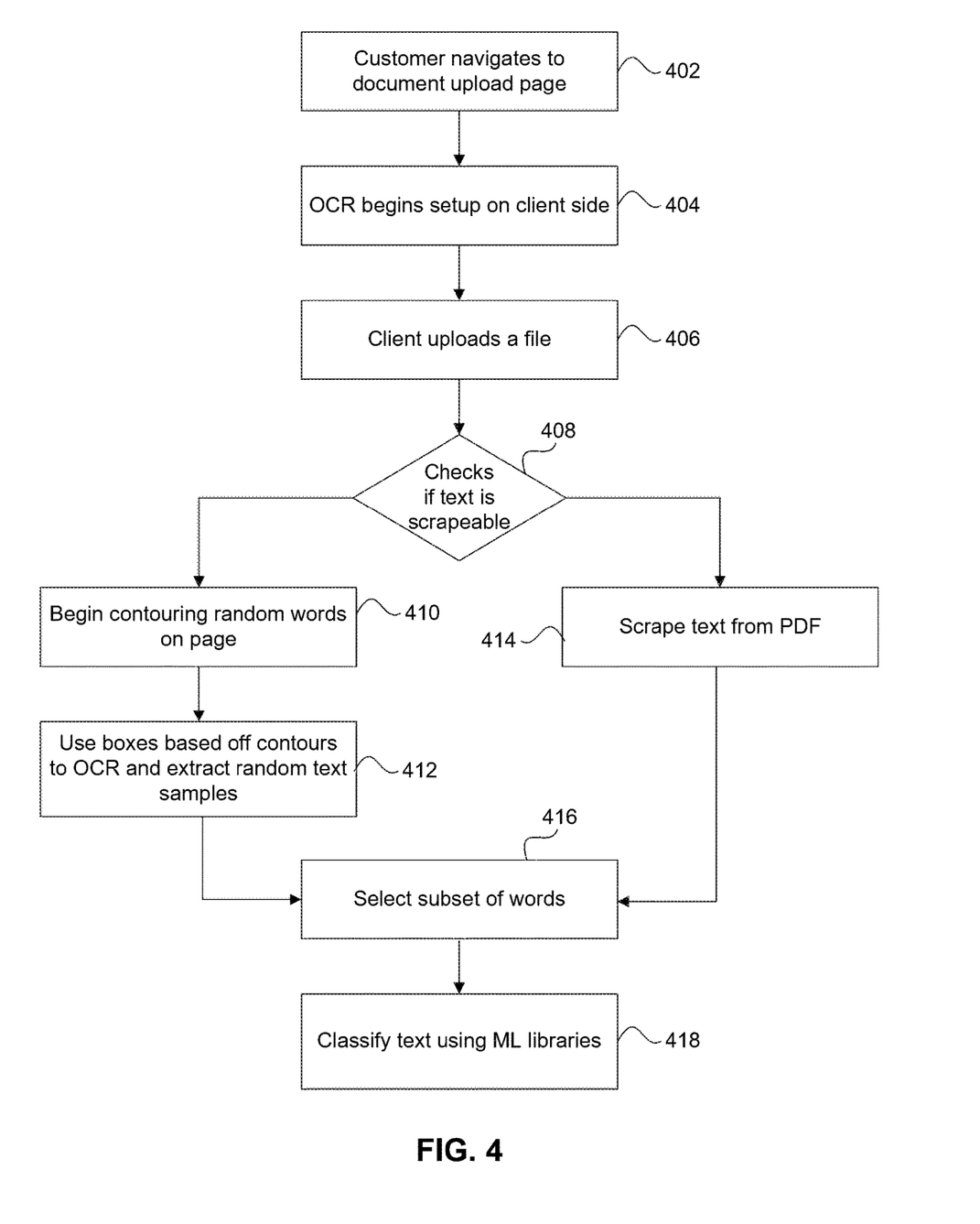
FIG. 4 illustrates an algorithm for document classification in accordance with some embodiments.

FIG. 4 illustrates an algorithm for document classification in accordance with some embodiments. As shown in FIG. 4, at 402, the user may navigate to a document upload page or interface by launching either a browser or a mobile application on the UE 202 as stated above. At 404, an OCR process may be initialized. At 406, the user 102 may upload the document 106 to the UE 202.

In accordance with some embodiments, at 408, the uploaded document 106 may be inspected to determine if its text is scrapable. For example, if the document 106 has searchable text properties, text from the uploaded document 106 may be scraped without using OCR. For example, when the uploaded document is of type ".doc," ".docx," or ".pdf," then it is possible that the text from the uploaded document 106 may be extracted without using OCR as shown by 414. Otherwise, as shown by 410, the steps described in accordance with 302 may be performed to identify the one or more bounding boxes as contours around sets of words on the page. In some embodiments, the word sets are randomly selected among those identified based on differences between light and dark areas of the page. At 412, steps described herein with reference to 304 may be performed to extract a set of words corresponding to each bounding box determined at 410. Steps 416 and 418 correspond with steps 308 and 310, respectively, which are described above in detail. Accordingly, the description corresponding to steps 416 and 418 is not repeated for brevity.

As discussed above, in some embodiments, all steps in FIG. 4 are performed locally to the UE, without requiring any steps to be performed by a remote server. This allows for real-time or near real-time analysis of the document and its classification.

Figure 5:
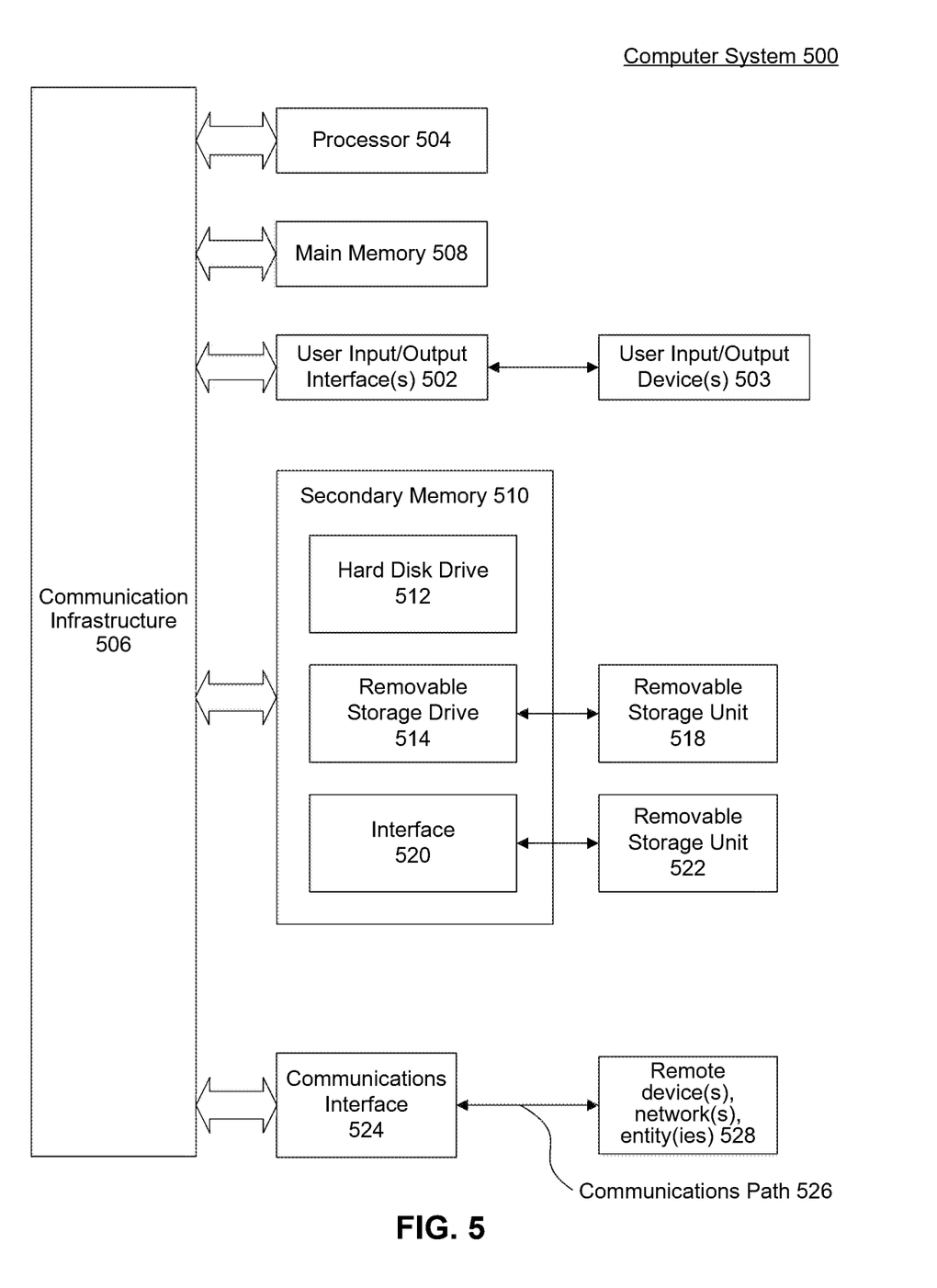
FIG. 5 illustrates an exemplary computer system, in accordance with some embodiments.

FIG. 5 illustrates an example of a computer system, in accordance with some embodiments.

Various embodiments may be implemented, for example, using one or more well-known computer systems, such as a computer system 500 as shown in FIG. 5. One or more computer systems 500 may be used, for example, to implement any of the embodiments discussed herein, as well as combinations and sub-combinations thereof. By way of a non-limiting example, the computer system 500 may be used to implement the application server 108.

The computer system 500 may include one or more processors (also called central processing units, or CPUs), such as a processor 504. The processor 504 may be connected to a communication infrastructure or bus 506.

The computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive.

The removable storage drive 514 may interact with a removable storage unit 518. The removable storage unit 518 may include a computer-usable or readable storage device having stored thereon computer software (control logic) and/or data. The removable storage unit 418 may be a floppy disk, magnetic tape, compact disk, DVD, optical storage disk, and/any other computer data storage device. The removable storage drive 514 may read from and/or write to a removable storage unit 518.

The secondary memory 510 may include other means, devices, components, instrumentalities, or other approaches for allowing computer programs and/or other instructions and/or data to be accessed by the computer system 500. Such means, devices, components, instrumentalities, or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may allow the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communication path 526.

The computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

The computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer-usable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method for classifying a document in real-time, comprising:
    identifying a first section of the document likely to contain text based on a comparison of a ratio of dark space to light space in an image of the document to a predetermined threshold;
    performing optical character recognition within the identified first section of the document to identify a first set of words within the identified first section of the document;
    extracting the first set of words from the identified first section of the document;
    selecting a first subset of the first set of words for classifying the document based on a preconfigured option, wherein the preconfigured option comprises at least one of selecting the first subset of the first set of words based on a number of characters in each word of the first set of words, selecting the first subset of the first set of words based on an order of each word of the first set of words, and selecting the first subset of the first set of words randomly;
    classifying the document by inputting the selected first subset of the first set of words into one or more machine learning models, wherein the one or more machine learning models determine a classification of the document; and
    transmitting the document and the determined classification of the document to an external server.

2. The method of claim 1, further comprising:
    identifying a second section of the document likely to contain text based on a comparison of the ratio of dark space to light space in the image of the document to the predetermined threshold;
    performing optical character recognition within the identified second section of the document to identify a second set of words within the identified second section of the document;
    extracting the second set of words from the identified second section of the document;
    selecting a second subset of the second set of words for classifying the document based on the preconfigured option; and
    wherein the classifying further comprises inputting a list of words, the list of words comprising words from the selected first subset and the selected second subset into the one or more machine learning models.

3. The method of claim 2, wherein identifying the first section or the second section further comprises dynamically identifying a portion of the document based on a size of the image of the document.

4. The method of claim 1, wherein a combined size of the one or more machine learning models is equal to or less than 500 kilobytes.

5. The method of claim 1, wherein the predetermined threshold is configurable or preconfigured.

6. The method of claim 1, wherein the image of the document is received at a user device via a camera of the user device prior to the identifying.

7. The method of claim 1, wherein the image of the document is received at a user device via a radio interface.

8. The method of claim 1, further comprising requesting a user verification of the determined classification of the document prior to the transmitting.

9. The method of claim 1, wherein each of the identifying, performing, extracting, selecting, classifying, and transmitting is performed by a user device.

10. The method of claim 1, wherein each of the identifying, performing, extracting, selecting, classifying, and transmitting is performed within an internet browser or a mobile application of a user device.

11. The method of claim 1, wherein each of the identifying, performing, extracting, selecting, classifying, and transmitting is performed by an application server.

12. A user device for classifying a document in real-time, comprising:
    a memory for storing instructions; and
    one or more processors, communicatively coupled to the memory, configured to execute the instructions, the instructions causing the one or more processors to:
    identify a first section of the document likely to contain text based on a comparison of a ratio of dark space to light space in an image of the document to a predetermined threshold;
    perform optical character recognition within the identified first section of the document to identify a first set of words within the identified first section of the document;

extract the first set of words from the identified first section of the document;

select a first subset of the first set of words for classifying the document based on a preconfigured option, wherein the preconfigured option comprises at least one of selecting the first subset of the first set of words based on a number of characters in each word of the first set of words, selecting the first subset of the first set of words based on an order of each word of the first set of words, and selecting the first subset of the first set of words randomly;

classify the document by inputting the selected first subset of the first set of words into one or more machine learning models, wherein the one or more machine learning models determine a classification of the document; and transmit the document and the determined classification of the document to an external server.

13. The user device of claim 12, wherein to identify the first section, the one or more processors are further configured to dynamically identify a portion of the document based on a size of the image of the document.

14. The user device of claim 12, wherein size of each of the one or more machine learning models is not greater than 500 kilobytes.

15. The user device of claim 12, wherein the predetermined threshold is configurable or preconfigured.

16. The user device of claim 12, wherein the image of the document is received at the user device via a camera of the user device prior to the identifying.

17. The user device of claim 12, wherein the image of the document is received at the user device via a radio interface.

18. The user device of claim 12, wherein the one or more processors are further configured to request a user verification of the determined classification of the document prior to the transmitting.

19. A non-transitory, tangible computer-readable device having instructions stored thereon that, when executed by at least one computing device, cause the at least one computing device to perform operations comprising:

identifying a first section of a document likely to contain text based on a comparison of a ratio of dark space to light space in an image of the document to a predetermined threshold;

performing optical character recognition within the identified first section of the document to identify a first set of words within the identified first section of the document;

extracting the first set of words from the identified first section of the document;

selecting a first subset of the first set of words for classifying the document based on a preconfigured option, wherein the preconfigured option comprises at least one of selecting the first subset of the first set of words based on a number of characters in each word of the first set of words, selecting the first subset of the first set of words based on an order of each word of the first set of words, and selecting the first subset of the first set of words randomly;

classifying the document by inputting the selected first subset of the first set of words into one or more machine learning models, wherein the one or more machine learning models determine a classification of the document; and transmitting the document and the determined classification of the document to an external server.

\* \* \* \* \*